(12) United States Patent
Lange et al.

(10) Patent No.: US 9,566,844 B2
(45) Date of Patent: Feb. 14, 2017

(54) VENTILATION CONTROLLING APPARATUS AND METHOD FOR CONTROLLING VENTILATION IN MOTOR VEHICLES

(75) Inventors: Michael Lange, Rochester Hills, MI (US); Gunnar Schlinke, Troy, MI (US); Thomas Rappel, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 1440 days.

(21) Appl. No.: 12/299,703

(22) PCT Filed: May 4, 2007

(86) PCT No.: PCT/US2007/010901
§ 371 (c)(1),
(2), (4) Date: Feb. 3, 2009

(87) PCT Pub. No.: WO2007/133486
PCT Pub. Date: Nov. 22, 2007

(65) Prior Publication Data
US 2009/0305623 A1 Dec. 10, 2009

Related U.S. Application Data

(60) Provisional application No. 60/798,720, filed on May 9, 2006.

(51) Int. Cl.
*B60S 1/54* (2006.01)
*B60H 1/00* (2006.01)

(52) U.S. Cl.
CPC ...... *B60H 1/00857* (2013.01); *B60H 1/00671* (2013.01); *B60H 2001/00707* (2013.01)

(58) Field of Classification Search
CPC .................................................. B60H 1/00842
USPC .... 454/121, 123, 127, 69, 156, 157, 158, 12
See application file for complete search history.

(56) References Cited

U.S. PATENT DOCUMENTS

| | | | | |
|---|---|---|---|---|
| 3,635,245 A * | 1/1972 | Canfield | ........................ | 137/607 |
| 3,911,953 A * | 10/1975 | Crombie et al. | .............. | 137/595 |
| 3,994,335 A * | 11/1976 | Perkins | ......................... | 165/103 |
| 4,420,115 A * | 12/1983 | Matsushima et al. | ... | 237/12.3 A |
| 5,779,535 A * | 7/1998 | Bendell et al. | ............... | 454/121 |
| 6,045,444 A * | 4/2000 | Zima et al. | ................... | 454/121 |
| 6,463,998 B1 * | 10/2002 | Shindo | .......................... | 165/204 |
| 6,581,678 B1 * | 6/2003 | Groemmer et al. | ............ | 165/42 |
| 6,736,718 B2 * | 5/2004 | Akahane | ......................... | 454/69 |

(Continued)

FOREIGN PATENT DOCUMENTS

DE  197 57 280 A1  7/1998
EP  600779 A1 *  6/1994
(Continued)

*Primary Examiner* — Alissa Tompkins
*Assistant Examiner* — Eric Gorman
(74) *Attorney, Agent, or Firm* — Muncy, Geissler, Olds & Lowe, P.C.

(57) ABSTRACT

A ventilation controlling apparatus for feeding windshield defrost outlets and side window demist outlets in motor vehicles with one or more air passages and respective doors for each outlet. The apparatus supports a mode in which the demist door opens up to a predefined angle without the defrost door opening, too, with the predefined angle depending on the design of a cam attached to the demist door and a pin engaged with that cam and attached to the defrost door.

20 Claims, 7 Drawing Sheets

(56) References Cited

U.S. PATENT DOCUMENTS

2002/0197951 A1    12/2002   Uemura et al.
2014/0080399 A1*   3/2014   Takai .................. B60H 1/3421
                                                                 454/155

FOREIGN PATENT DOCUMENTS

| EP | 1 024 041 A1 | | 8/2000 |
|----|----|----|----|
| EP | 1726460 A1 | * | 11/2006 |
| FR | 2063253 A | * | 7/1971 |
| GB | 957997 | | 5/1964 |
| JP | 61-229609 A | | 10/1986 |

* cited by examiner

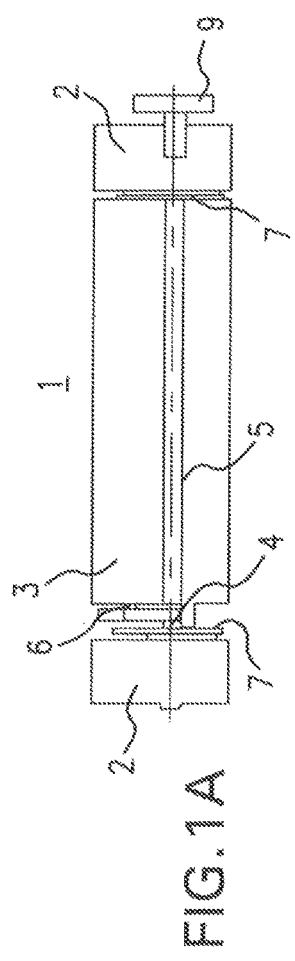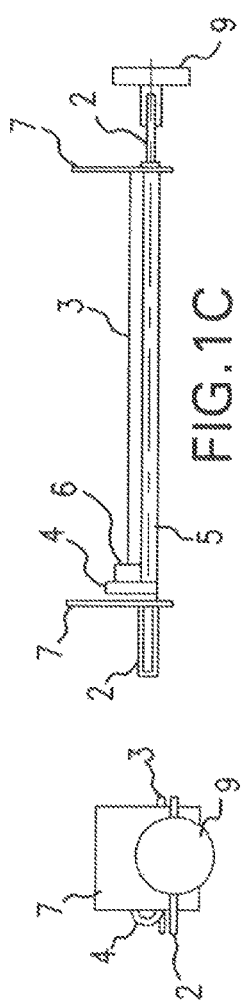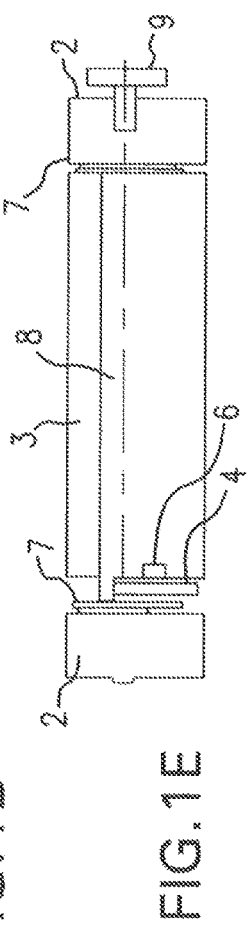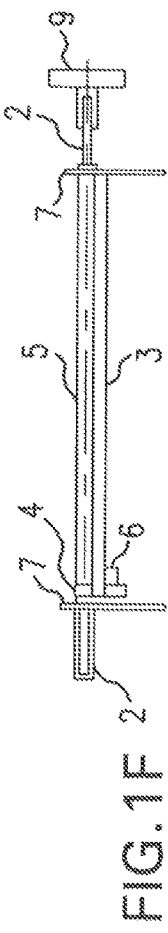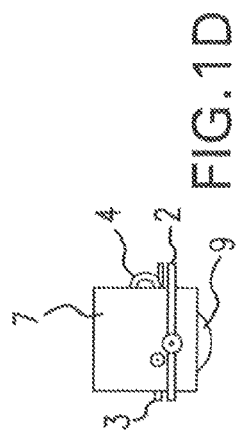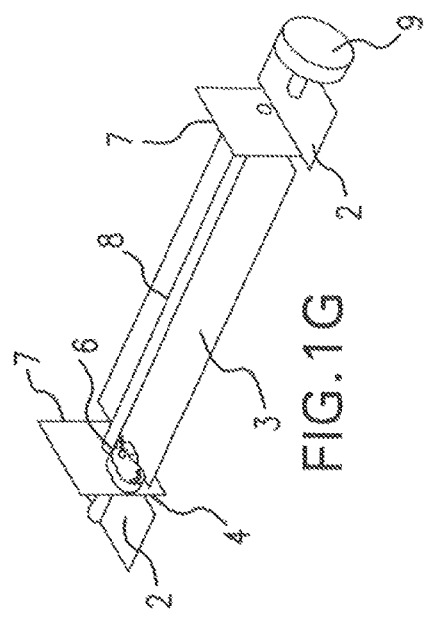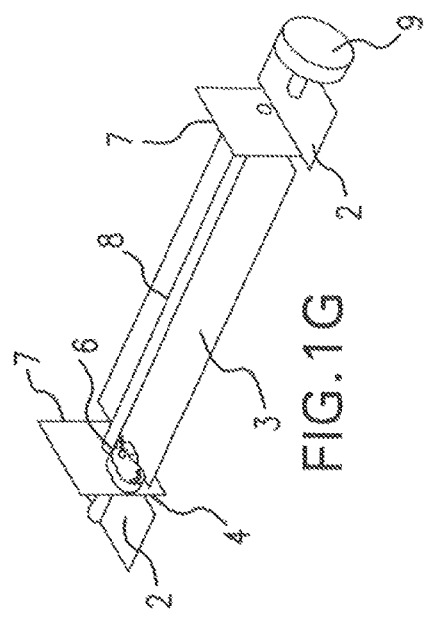

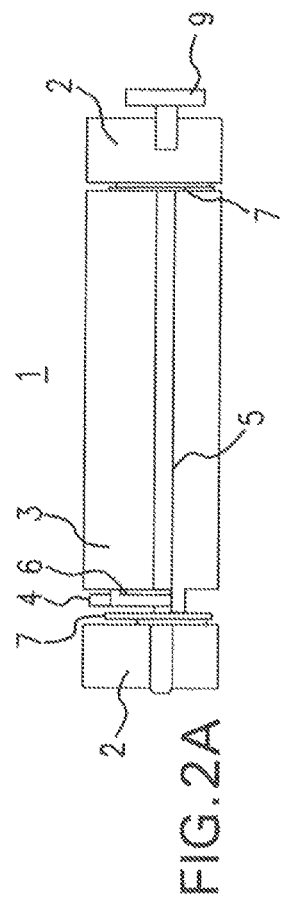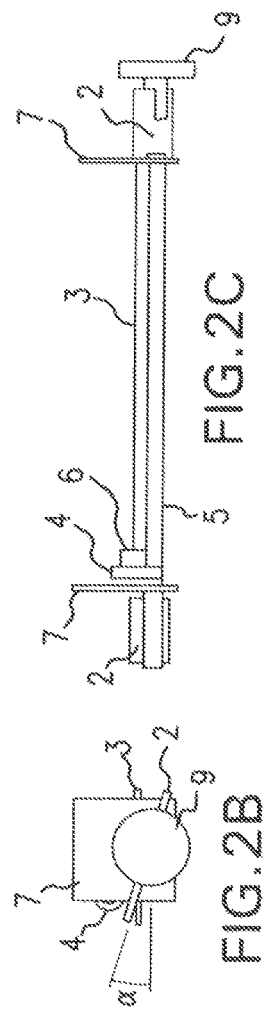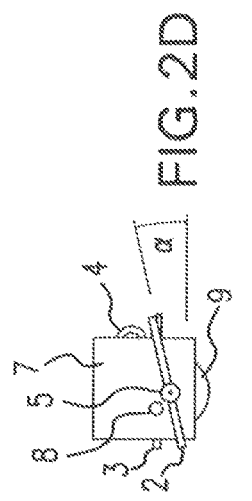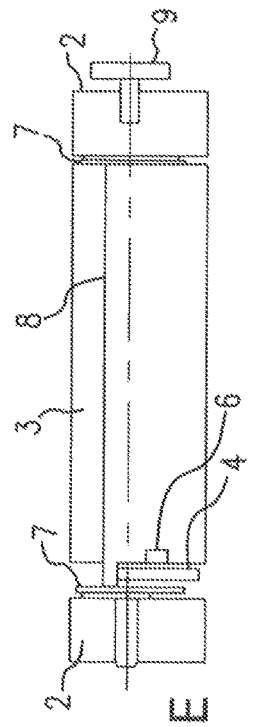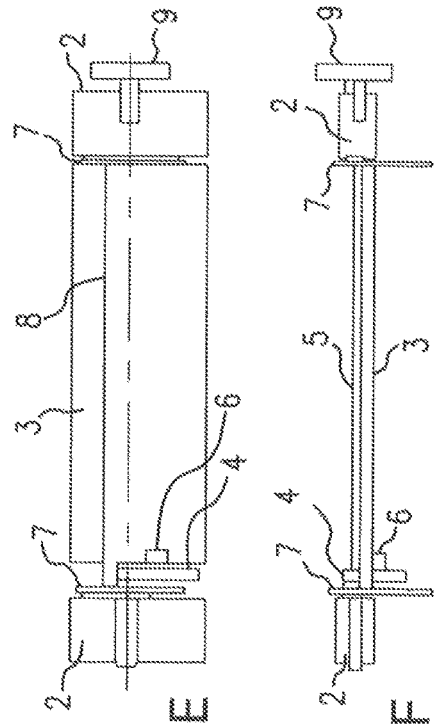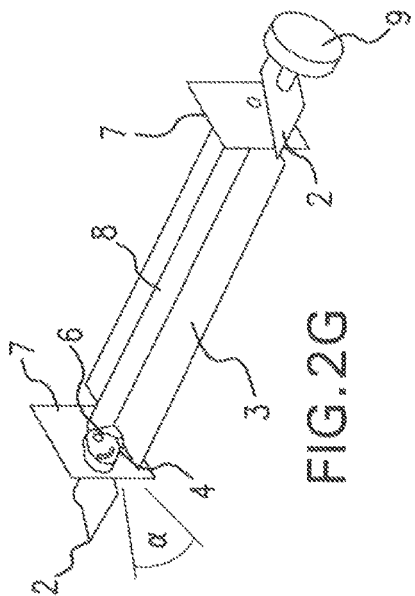

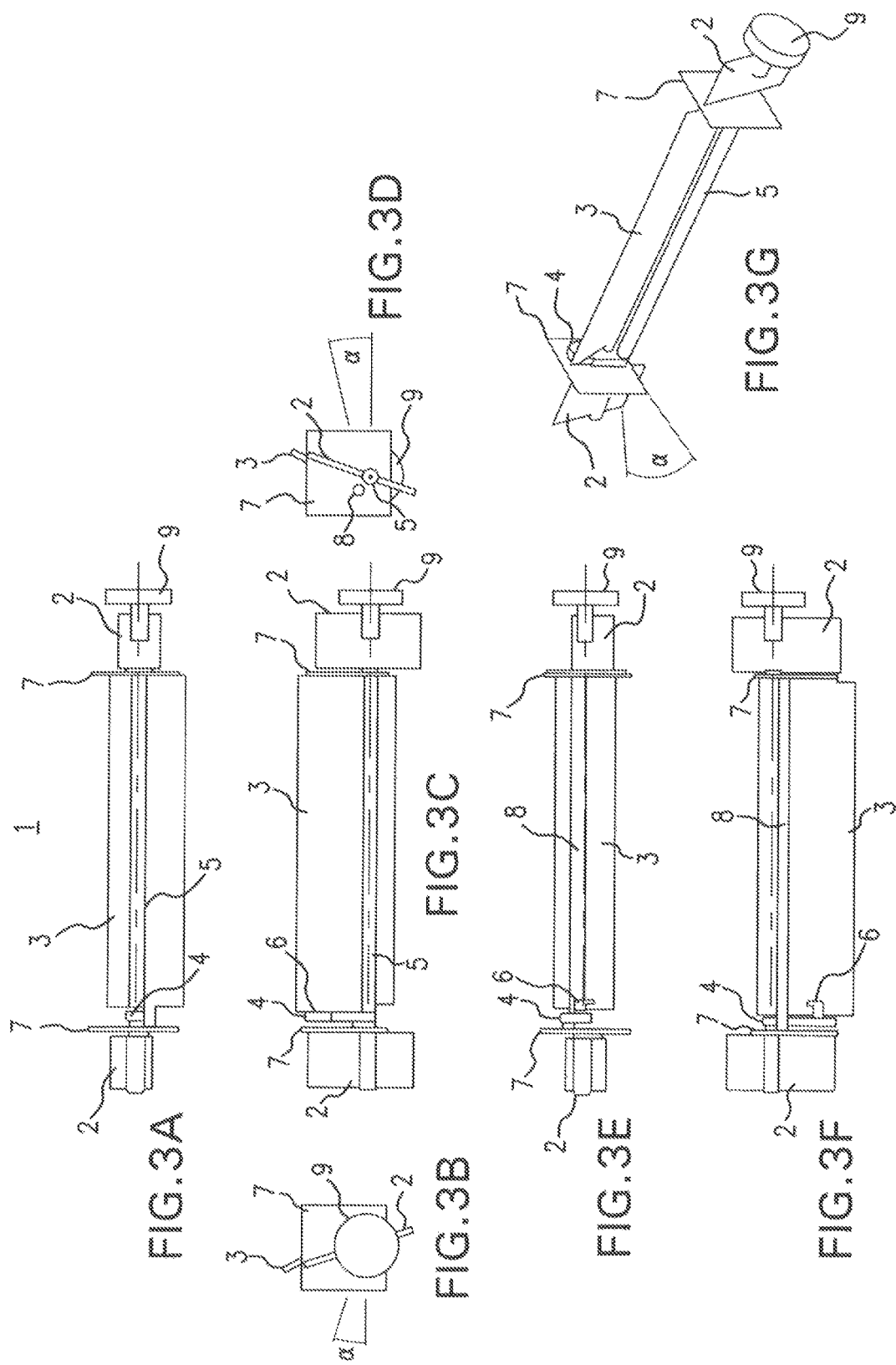

VENTILATION CONTROLLING APPARATUS AND METHOD FOR CONTROLLING VENTILATION IN MOTOR VEHICLES

BACKGROUND OF THE INVENTION

The present invention relates to a ventilation controlling apparatus and a method for controlling ventilation, particularly for feeding defrost and side window demist outlets in motor vehicles.

In motor vehicles at moderate outside temperatures (up to 25° C.) passengers usually prefer using the bi-level ventilation mode of a heating, ventilation and air conditioning (HVAC) unit. In this mode vent and floor outlets are at least partially open. When air humidity is high as it tends to be the case the more passengers are inside the side windows are prone to fog up. To keep passengers comfortable in this situation the side windows demist outlets have to be open while the defrost outlets remain closed. Otherwise there could emerge a fogged up spot on the outside of the windshield.

There are different approaches known for solving this problem. One is the usage of a film door inside the ventilation controlling apparatus as in US 2002/0197951 A1. A film door is a film which is moved by two coils, one of them spring loaded. The film has openings stamped out such that the cross sectional open area allows for air to flow through. A ventilation controlling apparatus with such a film door can easily be designed so it solves the aforesaid problem. The disadvantage is its need for space in order to package the two coils as well as the challenge to seal the moving film reliably.

Furthermore the sealing can lead to a wiping or scratching noise during operation which is annoying for the passengers.

Another approach as in DE 197 57 280 A1 uses moving doors or butterfly valves equipped with sealing foam wiping on a surface and thus keeping air from flowing to the defrost outlet while the synchronously turned door for the side window demist outlet is already open in this mode. However the wiping or scratching noise problem applies to this solution, too.

SUMMARY OF THE INVENTION

It is accordingly an object of the invention to provide an improved ventilation controlling apparatus and a method for controlling ventilation to allow for providing an air flow to a side window demist outlet in bi-level mode while the defrost outlet is kept closed.

With the foregoing and other objects in view there is provided, in accordance with the invention a ventilation controlling apparatus, comprising:
  a casing for forming at least one sealable first air passage and at least one sealable second air passage, said air passages separated from each other by at least one partition wall;
  each of said first air passages sealable by turning one respective first door attached to a pivoted first shaft to a respective door stop position;
  each of said second air passages with one respective second door attached to a pivoted second shaft to a respective door stop position;
  a drive element attached to said first shaft;
  a mechanical link causing the angle of said second shaft to be a function of the angle of said first shaft in such a way that said second door remains in its respective door stop position as long as said first door has an angle ranging from its respective door stop position where it seals tight said first air passage to a predefined aperture angle and that said second door opens when said first door has an angle exceeding said predefined aperture angle.

The predefinition of this predefined aperture angle is achieved by an appropriate design of said mechanical link. Each shaft can be one-piece or split so its respective door is attached to two of its sections interrupted in the region of the door, so the door has to perform the task of the shaft here. Furthermore a shaft can be made in one piece with its respective door especially if they are made of a mouldable or castable material like metal or plastics. In the same way it is possible to make the drive element in one piece with the first shaft. Alternatively shafts, doors and drive element can be single parts, too.

In other words, according to the invention, when the first door is in its door stop position the second will be, too. The second door will stay so, as long as the first door is turned by means of the drive element between its door stop position and a predefined aperture angle. As soon as the first door is moved beyond that predefined aperture angle the second door will open, too. When feeding vehicle side window demist outlets with air flow from the first door and a windshield defrost outlet with air from the second one and turning the drive element to said predefined aperture angle by selecting bi-level mode, the side window demist outlets are given an air flow while the windshield defrost door is not, thus avoiding fogging of the side windows and fog spots on the outside of the windshield.

According to another feature of the invention, the drive element is a gear in order to ease setting its angle.

According to yet another feature of the invention, the mechanical link comprises a cam and a pin engaged in the cam, so that turning of the first shaft or the attached drive element causes the second shaft to turn in a way predefined by the cam track. A cam is one of the easiest ways to achieve this behavior. The cam can be attached to the first shaft, to the drive element or to one of the first doors for this purpose and can also be made in one piece together with the part to which it is attached or incorporated in the drive element. The pin can be attached to one of the second doors or to a lever again attached to the second shaft. Again it is possible to make the pin in one piece with the part to which it is attached and so it is for the lever. Alternatively cam, pin and lever can be single parts, too.

In an alternative embodiment of the invention, the second shaft or a part of it is arranged coaxially inside a hollow section of the first one or vice versa. The mechanical link comprises a loaded spring engaged with both shafts in this case. This way the ventilation controlling apparatus can be built compactly.

According to a preferred feature of the invention, the shafts parallel each other, which saves space.

In a particularly preferred embodiment of the invention, the ventilation controlling apparatus comprises two first air passages and two second air passages with their respective doors separated by partition walls from each other, wherein the two first doors are attached to a common first shaft and the two second doors to a common second shaft, so they turn synchronously.

According to another feature of the invention, the two second air passages are arranged adjacently to each other in a central region of the casing and the two first air passages are arranged beside them adjacently to one second air passage and to one outboard wall of the casing each, so the apparatus is fit for providing an air flow to two or more central outlets by the second air passages and one lateral outlet on both sides by the first air passages.

According to yet another feature of the invention, the first shaft has its bearings in two outboard walls of the casing and the second shaft has its bearings in two partition walls between first and second air passages.

The preferred use of the ventilation controlling apparatus is with a motor vehicle, wherein the first air passages feed the side window demist outlets and the second air passages feed the defrost windshield outlet.

The predefined aperture angle is preferably within a range of 5° to 60°, particularly 10° to 40°.

In a preferred embodiment of the invention, the predefined angle equals 18° as required by some car manufacturers' specifications.

The angle of the drive element and thus the first shaft is preferably controlled by the ventilation mode selected by the vehicle operator so that the first door is turned to its predefined aperture angle when bi-level mode is selected. When vent mode is selected, the first door is turned to its door stop position to keep air from flowing to the side window demist outlets and thus the first door remains closed, too.

Although the invention is illustrated and described herein as embodied in a ventilation controlling apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A is a bottom view of a first embodiment of a ventilation controlling apparatus according to the invention with two first doors, one second door, a cam attached to the first shaft and a pin attached to the second door and engaged in the cam in a state with all doors closed;

FIG. 1B is a side view of the embodiment of a ventilation controlling apparatus according to FIG. 1A;

FIG. 1C is a front view of the embodiment of a ventilation controlling apparatus according to FIG. 1A;

FIG. 1D is another side view of the embodiment of a ventilation controlling apparatus according to FIG. 1A;

FIG. 1E is a top view of the embodiment of a ventilation controlling apparatus according to FIG. 1A;

FIG. 1F is a back view of the embodiment of a ventilation controlling apparatus according to FIG. 1A;

FIG. 1G is a perspective view of the embodiment of a ventilation controlling apparatus according to FIG. 1A;

FIG. 2A is a bottom view of the embodiment of a ventilation controlling apparatus according to FIG. 1A in another state with the first doors partially open and the second door closed;

FIG. 2B is a side view of the embodiment of a ventilation controlling apparatus according to FIG. 2A;

FIG. 2C is a front view of the embodiment of a ventilation controlling apparatus according to FIG. 2A;

FIG. 2D is another side view of the embodiment of a ventilation controlling apparatus according to FIG. 2A;

FIG. 2E is a top view of the embodiment of a ventilation controlling apparatus according to FIG. 2A;

FIG. 2F is a back view of the embodiment of a ventilation controlling apparatus according to FIG. 2A;

FIG. 2G is a perspective view of the embodiment of a ventilation controlling apparatus according to FIG. 2A;

FIG. 3A is a bottom view of the embodiment of a ventilation controlling apparatus according to FIG. 1A in yet another state with all doors open;

FIG. 3B is a side view of the embodiment of a ventilation controlling apparatus according to FIG. 3A;

FIG. 3C is a front view of the embodiment of a ventilation controlling apparatus according to FIG. 3A;

FIG. 3D is another side view of the embodiment of a ventilation controlling apparatus according to FIG. 3A;

FIG. 3E is a top view of the embodiment of a ventilation controlling apparatus according to FIG. 3A;

FIG. 3F is a back view of the embodiment of a ventilation controlling apparatus according to FIG. 3A;

FIG. 3G is a perspective view of the embodiment of a ventilation controlling apparatus according to FIG. 3A;

DESCRIPTION OF THE PREFERRED EMBODIMENTS

Figure 4A:
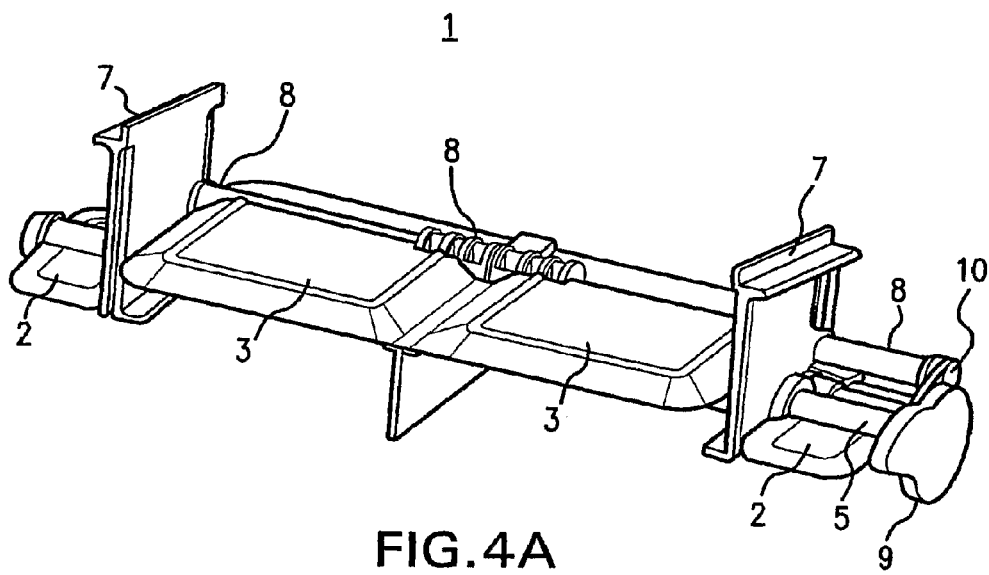
FIG. 4A is a perspective view of a preferred embodiment of a ventilation controlling apparatus according to the invention with two first doors, two second doors, a cam attached to the drive element, a lever attached to the second shaft with an attached pin engaged in the cam in a state with all doors closed.

Referring now to the figures of the drawings in detail and first, particularly, to FIG. 1A thereof, there is shown the bottom view of a first embodiment of a ventilation controlling apparatus 1 according to the invention with two first doors 2, one second door 3 and a cam 4 attached to the first shaft 5 to which the first doors 2 are also attached. A pin 6 is attached to the second door 3 and engaged in the cam 4. The air passages (not shown in their entirety) sealable by the doors 2, 3 are separated by partition walls 7 where a second shaft 8 (only shown in the top view in FIG. 1E and the perspective view in FIG. 1G) molded in one piece with the second door 3 has its bearings.

The first shaft 5 is turned by means of the drive element 9 to an angle which causes the first doors 2 attached to that first shaft 5 to take a so called door stop position, meaning they are aligned horizontally where they seal tight their respective air passages, which are designed accordingly. This becomes clear when regarding FIGS. 1B and 1D, which are side views of the ventilation controlling apparatus 1 and FIGS. 1C and 1F which are front and back view, respectively, thereof.

In FIG. 1G, which is a perspective view of the ventilation controlling apparatus 1, it is shown that the cam 4 is designed to hold the pin 6 in a position in this state where it keeps the second door 3 closed and aligned horizontally, too. The first doors 2 supply side window demisting outlets of a motor vehicle with an air flow. The second door 3 feeds the defrost windshield outlet.

In the condition described here and shown in FIG. 1A to 1G neither one of these outlets is given an air flow, as it is required when a vehicle operator selects, e.g., vent mode. There is a conventional means for setting an angle of the drive element 9, which can be a gear, for instance, according to the ventilation mode selected.

When the operator selects bi-level mode, this causes the drive element 9 to be turned to a predefined aperture angle α, preferably within a range of 5° to 60°, e.g. 18°, as shown in FIG. 2A to 2G, which show the same views as in FIG. 1A to 1G but with that different angle. The predefinition for α is achieved by an appropriate design of the cam 4. The first shaft 5 attached to the drive element 9 and first doors 2 take a position partially opening the first doors 2 and thus allowing an air flow to the side window demist outlets. This becomes particularly clear when regarding FIGS. 2B, 2D and 2G. The second door 3 is kept closed because the cam 4 is designed to keep the pin 6 in the respective position up to this predefined aperture angle α, which is best shown in FIG. 2G.

When the operator selects, e.g., defrost mode, the drive element 9 is turned to an angle beyond that predefined aperture angle α as shown in FIG. 3A to 3G, which again show the same views of the ventilation controlling apparatus as in FIG. 1A to 1G but that angle being bigger than α. The first doors 2 are opened wider than in FIG. 2A to 2G and the cam 4 pushes the pin 6 and thus causes the second door 3 to open, too.

The first shaft 5 has its bearings in the outboard walls of the casing (not shown in detail). In this embodiment of the invention the shafts 5, 8 are both one-piece, but they could alternatively be split so their respective doors 2, 3 would be attached to two sections of a shaft 5, 8 interrupted in the region of the door 2, 3, so the door 2, 3 would have to perform the task of the shaft 5, 8 here, transmitting torque for instance. Although the second shaft 8 is made in one piece with the second door 3 and the pin 6, they could be separate parts, too. The same applies to the first shaft 5, the first doors 2, the cam 4 and the drive element 9 attached thereon.

Figure 4B:
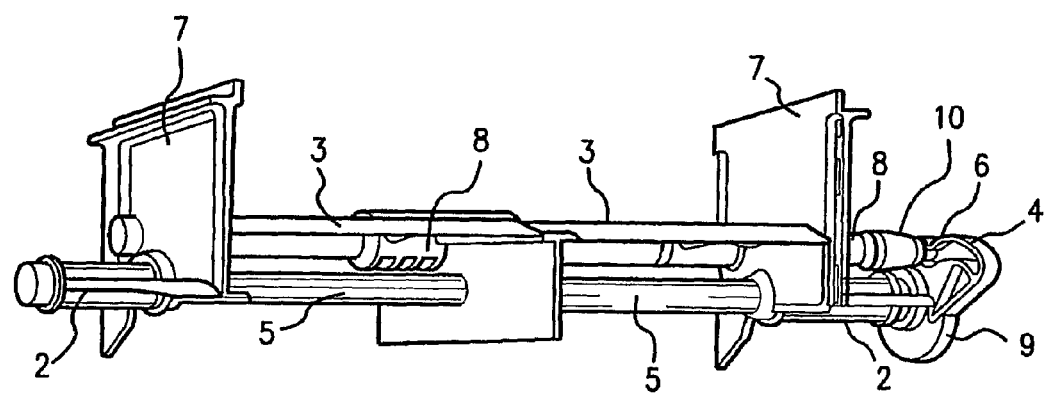
FIG. 4B is another perspective view of the embodiment of a ventilation controlling apparatus according to FIG. 4A.

FIG. 4A shows a perspective view of a preferred embodiment of a ventilation controlling apparatus 1 according to the invention. Two second doors 3 are cast in one piece with the sections of a second shaft 8, which has its bearings in the partition walls 7 between the second and the first air passages and a lever 10 with a pin 6 is located on one end of the second shaft 8 outside one of these partition walls 7. Two first doors 2 are attached to a first shaft 5 which has its bearings in the outboard walls of the casing and which has a drive element 9 with an incorporated cam 4 at one end, in which the pin 6 is engaged as, best shown in FIG. 4B, which is a perspective view from another point of view.

The drive element 9 can be a gear. In the condition shown here, i.e., when vent mode is selected by the vehicle operator, the first shaft 5 is turned by means of the drive element 9 to an angle which causes the first doors 2 to take a horizontal door stop position where they seal tight their respective air passages. The cam 4 is designed to hold the pin 6 in a position in this state where it keeps the second doors 3 closed too. The first doors 2 supply the side window demisting outlets of a motor vehicle with an air flow. The second doors 3 feed the defrost windshield outlet(s). In the condition described here and shown in FIGS. 4A and 4B, neither one of these outlets is given an air flow.

Figure 5A:
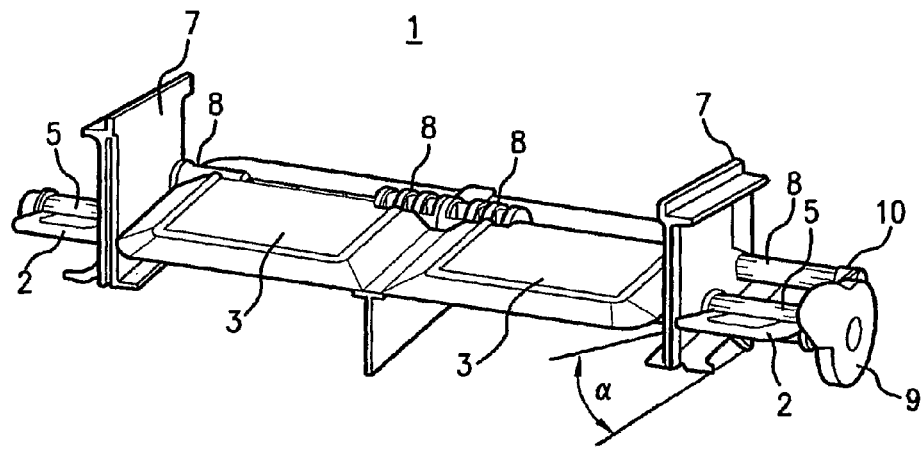
FIG. 5A is a perspective view of the embodiment of a ventilation controlling apparatus according to FIG. 4A in a state with the first doors partially open and the second doors closed.
Figure 5B:
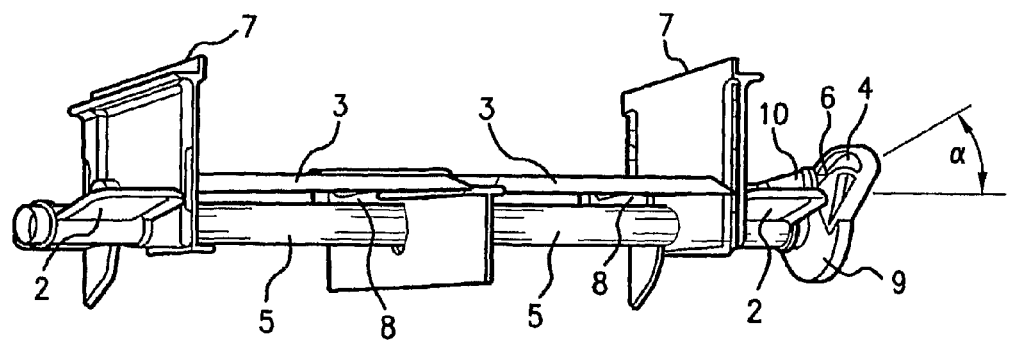
FIG. 5B is another perspective view of the embodiment of a ventilation controlling apparatus according to FIG. 5A.

When the operator selects bi-level mode and thus causes the drive element 9 to be turned to a predefined aperture angle α, e.g. 18°, as shown in FIG. 5A, the attached first shaft 5 and first doors 2 will take a position partially opening the first doors 2 and thus allowing an air flow to the side window demist outlets. FIGS. 5A and 5B show the ventilation controlling apparatus from the same points of view as in FIGS. 4A and 4B, but with the different angle. The second doors 3 are kept closed, because the cam 4 is designed to keep the pin 6 in the respective position up to this predefined aperture angle α (see FIG. 5B).

Figure 6A:
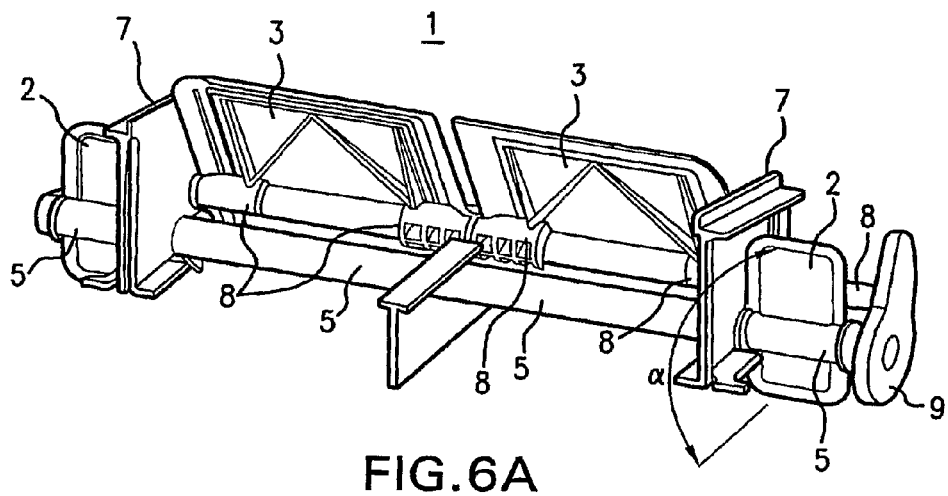
FIG. 6A is a perspective view of the embodiment of a ventilation controlling apparatus according to FIG. 4A in a state with all doors open.
Figure 6B:
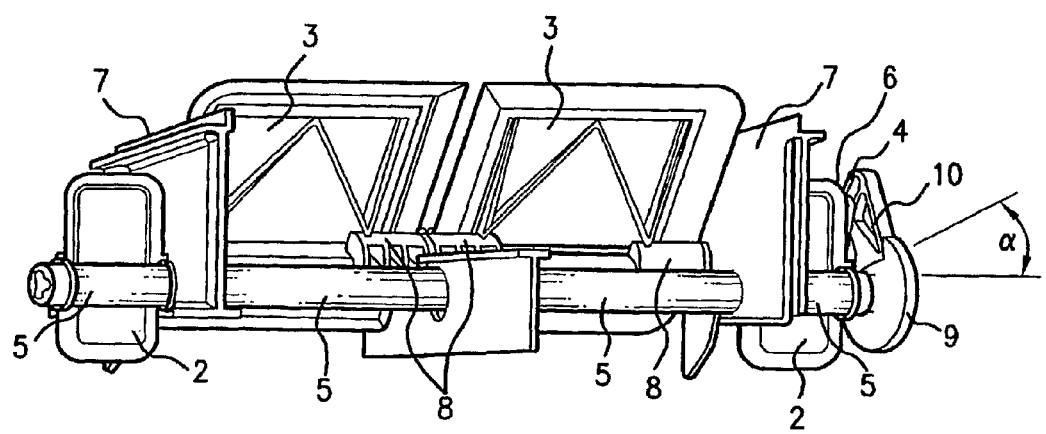
FIG. 6B is another perspective view of the embodiment of a ventilation controlling apparatus according to FIG. 6A.

When the operator selects, e.g., defrost mode, the drive element 9 is turned to an angle beyond that predefined aperture angle α, as shown in FIGS. 6A and 6B. These figures show the ventilation controlling apparatus from the same points of view as in FIGS. 4A and 4B but with an angle bigger than the predefined aperture angle α. The first doors 2 are opened wider than in FIGS. 5A and 5B, and the cam 4 pushes the pin 6 and thus causes the second doors 3 to open, too.

Figure 7:
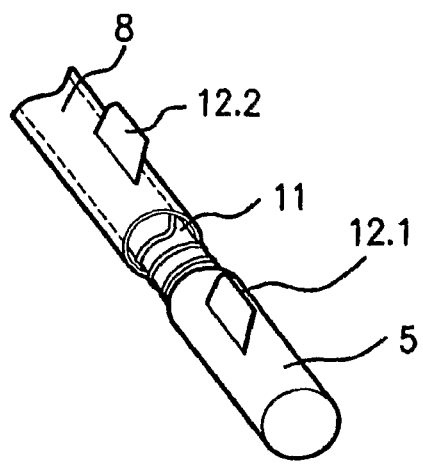
FIG. 7 is a perspective view of a cut-out of an alternative embodiment of a ventilation controlling apparatus with a first shaft arranged inside a second shaft, both engaged with a loaded torsion spring.

FIG. 7 shows a portion of an alternative embodiment of a ventilation controlling apparatus 1 according to the invention, with a first shaft 5 arranged coaxially inside a second shaft 8, both engaged with a loaded torsion spring 11 by appropriate tappets 12.1 and 12.2. The loaded spring has to have a prestressing that causes the second door (not shown) attached to the second shaft 8 to remain in its door stop position when the first door (not shown) is opened up to the predefined aperture angle α. In other words α is predefined by the prestress of that loaded spring 11, so the loaded spring is relaxed when the angle of the first door is equal to the predefined aperture angle α.

We claim:

1. A ventilation controlling apparatus, comprising:
   a casing for forming a sealable first air passage, an additional sealable first air passage, and at least one sealable second air passage, said first air passage and said second air passage being separated from each other by a first partition wall, and said additional first air passage and said second air passage being separated from each other by a second partition wall;
   a first door attached to a rotatable first shaft and arranged so as to be movable between a door stop position in which said first air passage is closed and at least one door open position;
   an additional first door attached to said rotatable first shaft and arranged so as to be movable between a door stop position in which said additional first air passage is closed and at least one door open position;
   a second door attached to a rotatable second shaft and arranged so as to be movable between a door stop position in which said second air passage is closed and at least one door open position, the second door disposed between said first door and said additional first door in a central region of said casing;
   a drive element attached to said first shaft; and
   a mechanical link comprising a cam and a pin engaged in said cam, said mechanical link configured to cause an angle of said second shaft to be a function of an angle of said first shaft such that said second door remains in its respective door stop position as long as said first door and said additional first door have an angle ranging from their respective door stop positions to a predefined aperture angle, and such that said second door opens when said first door and said additional first door have an angle exceeding said predefined aperture angle, wherein said first door and said additional first door have a same angle and a same door stop position, wherein said first door and said additional first door exceed said predefined aperture angle, said first door, said additional first door, and said second door move dependently of each other, and wherein said predefined aperture angle equals 18°.

2. The ventilation controlling apparatus according to claim 1, wherein said drive element comprises a gear.

3. The ventilation controlling apparatus according to claim 1, wherein said cam is attached to said first shaft such that a surface of said cam contacts said first shaft.

4. The ventilation controlling apparatus according to claim 1, wherein said cam is attached to said drive element such that a surface of said cam contacts said drive element.

5. The ventilation controlling apparatus according to claim 1, wherein said cam is attached to one of said first door and said additional first door such that a surface of said cam contacts the one of said first door and said additional first door.

6. The ventilation controlling apparatus according to claim 1, wherein said pin is attached to said second door such that a surface of said pin contacts said second door.

7. The ventilation controlling apparatus according to claim 1, wherein said mechanical link additionally comprises a lever attached to said second shaft, and said pin is attached to said lever such that a surface of said pin contacts said lever.

8. The ventilation controlling apparatus according to claim 1, wherein said first shaft is at least partially hollow and said second shaft is at least partially arranged coaxially inside of said first shaft and the mechanical link comprises a torsion spring engaged with said first shaft and said second shaft.

9. The ventilation controlling apparatus according to claim 1, wherein said second shaft is at least partially hollow and said first shaft is at least partially arranged coaxially inside of said second shaft and the mechanical link comprises a torsion spring engaged with said first shaft and said second shaft.

10. The ventilation controlling apparatus according to claim 1, wherein said second shaft is arranged parallel to said first shaft.

11. The ventilation controlling apparatus according to claim 1, further comprising:
an additional second air passage; and
an additional second door attached to said rotatable second shaft and arranged so as to be movable between a door stop position in which said additional second air passage is closed and at least one door open position, said additional second door disposed between said second door and one of said first door and said additional first door.

12. The ventilation controlling apparatus according to claim 11,
wherein said second air passage and said additional second air passage are arranged adjacently to each other in said central region of said casing,
wherein said first air passage is arranged adjacently to one of said second air passage and said additional second air passage and further arranged adjacently to a first outboard wall of said casing, and
wherein said additional first air passage is arranged adjacently to the other of said second air passage and said additional second air passage and further arranged adjacently to a second outboard wall of said casing.

13. The ventilation controlling apparatus according to claim 1, wherein said first shaft has bearings at least in two outboard walls of said casing, and said second shaft has a bearing at least in one of said first partition wall located between said first air passage and said second air passage and said second partition wall located between said additional first air passage and said second air passage.

14. A motor vehicle comprising a ventilation controlling apparatus according to claim 1, wherein said first air passage and said additional first air passage are connected to provide at least one side window demist air outlet with an air flow and said second air passage is connected to provide at least one defrost windshield outlet with an air flow.

15. A method for controlling ventilation with a ventilation controlling apparatus according to claim 1, comprising:
turning said drive element to set an angle of said first door and said additional first door;
by using said mechanical link, determining an angle of said second door as a function of the angle of said first door and said additional first door, such that said second door is caused to be in its respective door stop position as long as said first door and said additional first door have the angle ranging from their respective door stop positions to said predefined aperture angle; and
opening said second door when said first door and said additional first door have the angle exceeding said predefined aperture angle,
wherein the pin engages in said cam such that opening said second door occurs when said first door and said additional first door have the angle exceeding said predefined aperture angle.

16. The method according to claim 15 applied in a motor vehicle,
wherein an air flow from said first air passage and said additional first air passage feeds at least one side window demist outlet, the airflow from said second air passage feeds at least one defrost outlet, and an angle of said drive element and thus said first door and said additional first door is controlled by a ventilation mode selected by a motor vehicle operator so that said first door and said additional first door are turned to said predefined angle when a bi-level mode is selected.

17. The method according to claim 16, wherein said first door and said additional first door are in their door stop positions when a vent mode is selected.

18. The ventilation controlling apparatus according to claim 1, wherein said second shaft is parallel to and off-axis from said first shaft.

19. The ventilation controlling apparatus according to claim 1, wherein each of said first door, said additional first door and said second door is substantially planar and has a substantially rectangular cross section.

20. The ventilation controlling apparatus according to claim 11, wherein said additional second door is substantially planar and has a substantially rectangular cross section.

* * * * *